(12) United States Patent
Douglas

(10) Patent No.: US 7,669,627 B2
(45) Date of Patent: Mar. 2, 2010

(54) PNEUMATIC SEALING RING HAVING AN INNER TUBE AND EXPANDABLE LINER FOR A TUBE-TYPE TIRE

(76) Inventor: Jeffrey P. Douglas, 855 S. Wildflower La., Anaheim, CA (US) 92808

(*) Notice: Subject to any disclaimer, the term of this patent is extended or adjusted under 35 U.S.C. 154(b) by 0 days.

(21) Appl. No.: 11/416,443

(22) Filed: May 3, 2006

(65) Prior Publication Data
US 2007/0256769 A1 Nov. 8, 2007

(51) Int. Cl.
  *B60C 5/00* (2006.01)
  *B60C 5/02* (2006.01)
  *B60C 5/08* (2006.01)

(52) U.S. Cl. .................. 152/510; 152/331.1; 152/339.1; 152/511; 152/512

(58) Field of Classification Search .............. 152/331.1, 152/333.1, 334.1, 337.1, 338.1, 339.1, 340.1, 152/341.1, 342.1, 510, 511, 512
See application file for complete search history.

(56) References Cited

U.S. PATENT DOCUMENTS

| | | | |
|---|---|---|---|
| 5,246,050 A | 9/1993 | Stucker et al. | |
| 5,273,093 A | 12/1993 | Newton | |
| 6,688,359 B2 | 2/2004 | Blalock et al. | |
| 7,131,477 B2 * | 11/2006 | Smith | 152/400 |

FOREIGN PATENT DOCUMENTS

| DE | 2806325 | * | 8/1979 |
|---|---|---|---|
| DE | 3601318 | * | 7/1986 |
| GB | 1365907 | * | 9/1974 |
| GB | 2024737 | * | 1/1980 |

OTHER PUBLICATIONS

Machine translation of Schaefer (DE 2806325), 1979.*

* cited by examiner

*Primary Examiner*—Justin Fischer
(74) *Attorney, Agent, or Firm*—Morland C. Fischer

(57) ABSTRACT

A tube-type tire to be mounted on the rim of a (e.g., spoke-type) wheel such as that commonly used by a bicycle or a motorcycle, whereby the tube-type tire will operate without a conventional inner tube and as if it were tubeless. The tire includes a main tire section that is seated upon the generally flat shelf of the rim and a pneumatic sealing ring having an inner tube that is seated upon the beadwell of the rim. An air chamber of the inner tube of the sealing ring is inflated to a greater pressure than an air chamber of the main tire section so as to isolate the air chamber of the main tire section from the rim and force the main tire section against the vertical lip of the rim. The sealing ring also has an outer inflatable liner that is located in surrounding engagement with the inner tube to separate the inner tube from the air chamber of the main tire section. The outer liner has one or more O-ring seals projecting outwardly from the side walls thereof and a centering lip projecting downwardly from the side walls. The O-ring seals are moved into sealing engagement with the inside of the main tire section when the air chamber of the inner tube is inflated and the liner is expanded. The centering lips of the liner are seated upon the beadwell of the rim to cause the liner to be automatically centered over the inner tube.

18 Claims, 3 Drawing Sheets

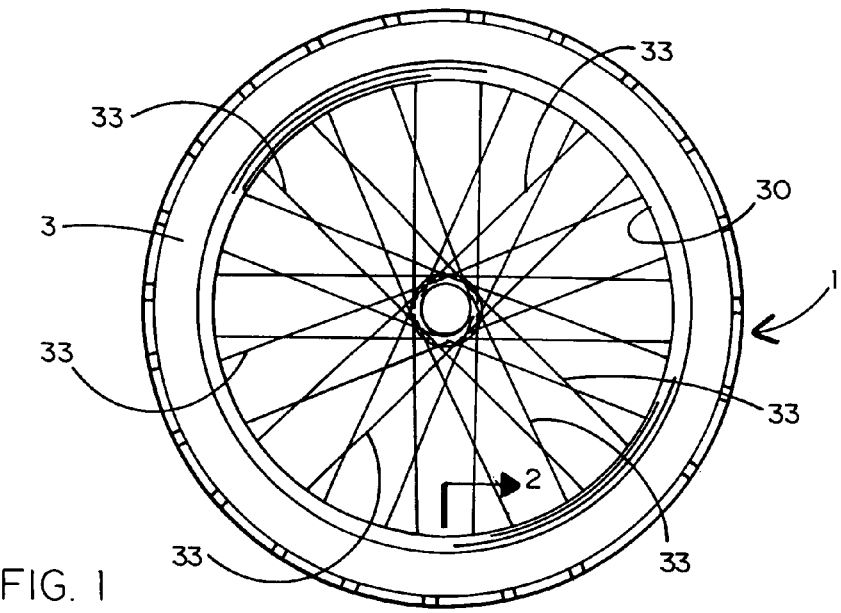
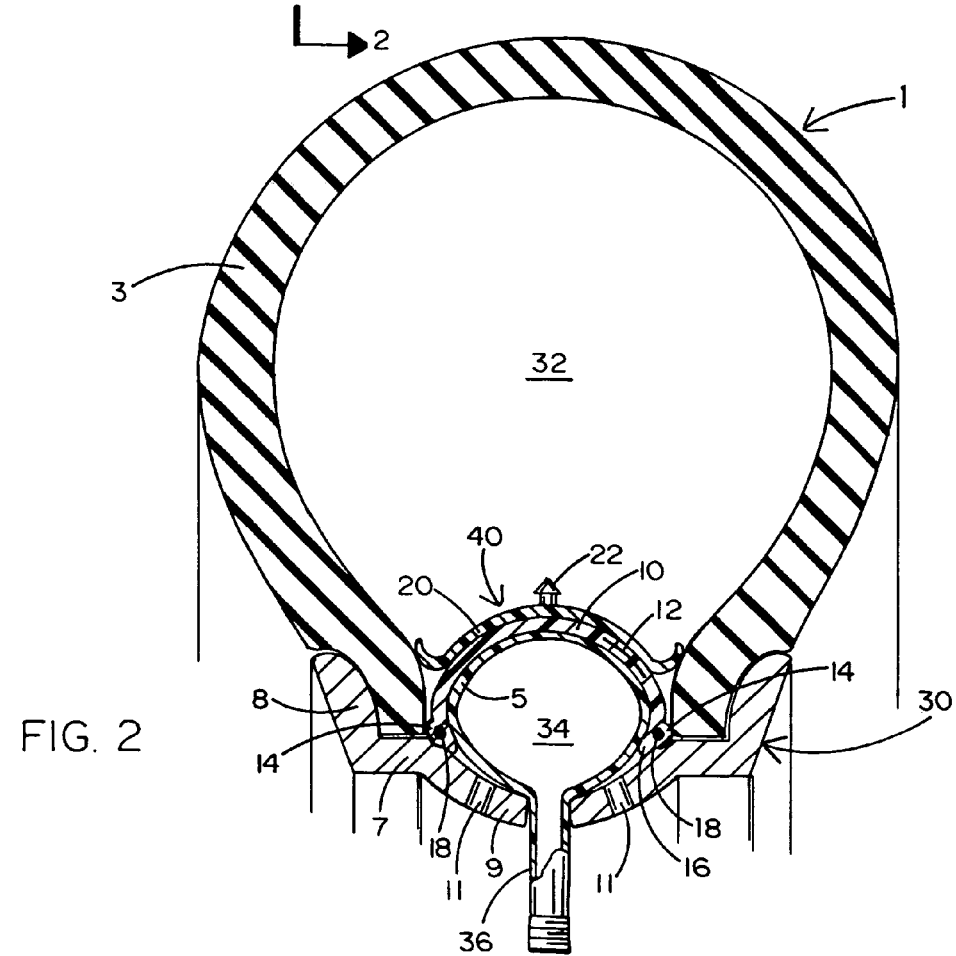
FIG. 1
FIG. 2

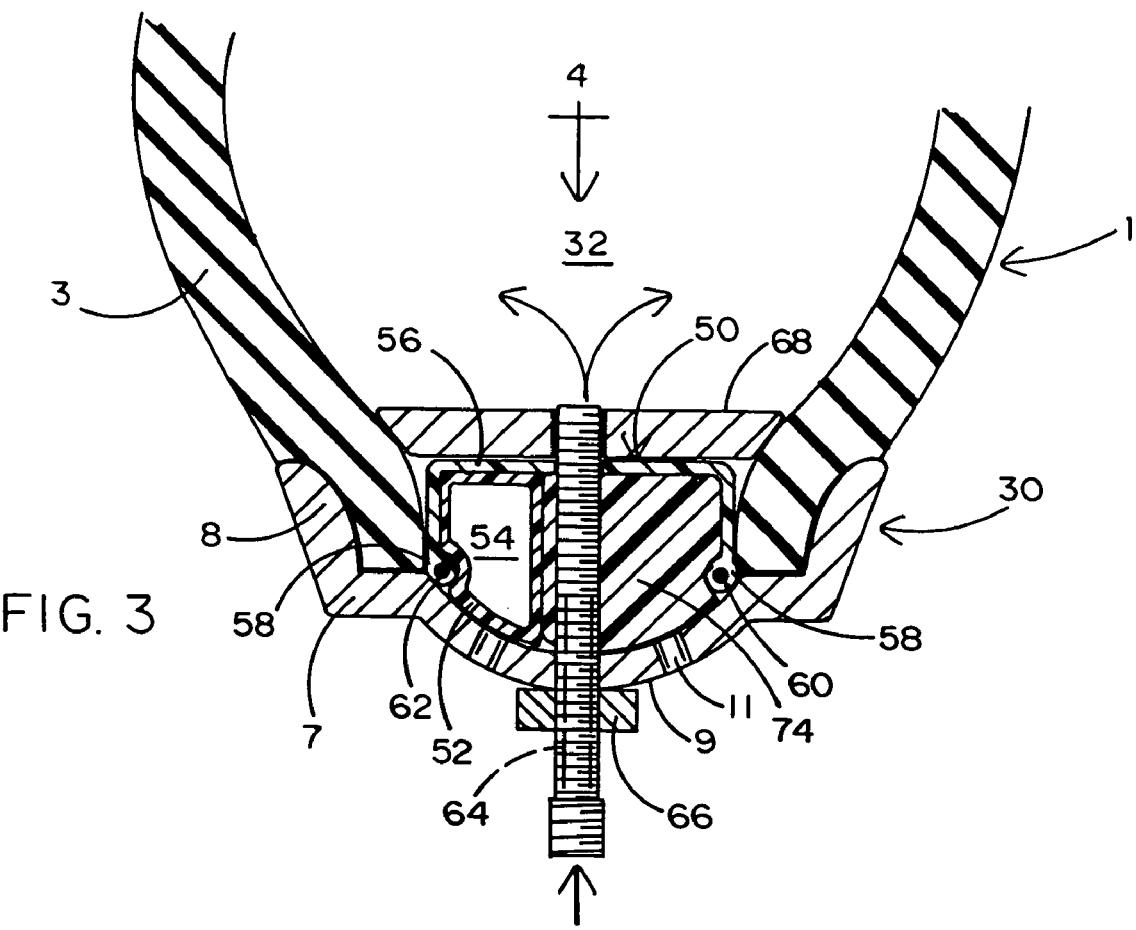
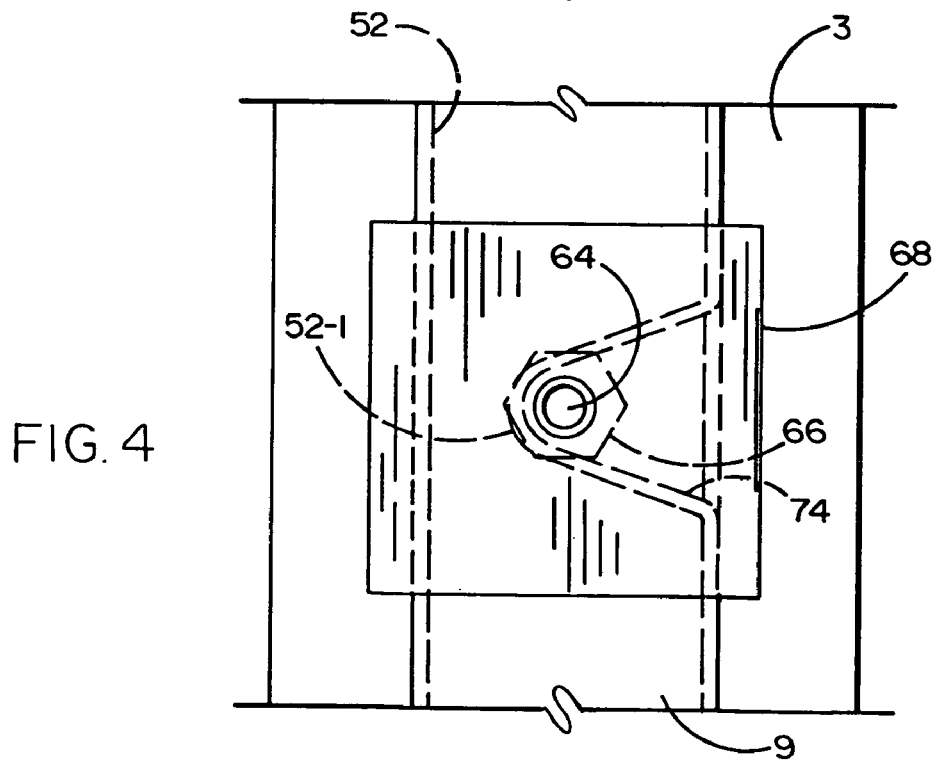

US 7,669,627 B2

PNEUMATIC SEALING RING HAVING AN INNER TUBE AND EXPANDABLE LINER FOR A TUBE-TYPE TIRE

BACKGROUND OF THE INVENTION

1. Field of the Invention

This invention relates to pneumatic sealing ring including an inner tube and an expandable liner extending in surrounding engagement thereover to be used with a tube-type tire and rim so that the tube-type tire will operate without a conventional inner tube and as if it were tubeless.

2. Background Art

A conventional tube-type tire is commonly known to have an inner tube associated therewith. A primary disadvantage of such a tube-type tire is that the rubber material of the inner tube is subject to pinching during use. Such a pinch may result in a tear and, ultimately, a pinch flat, whereby to place the tire out of service or in need of repair. The tools that are commonly used when a new tube-type tire is installed can also cause a pinch in the inner tube and the resulting damage to the tire.

In this same regard, the inner tube associated with the conventional tube-type tire is characteristically large, bulky and correspondingly heavy. These characteristics are not well suited for achieving the high performance that is required by racing vehicles on which such a tube-type tire may be used. In fact, such conventional tube-type tires can contribute to significant poundage when mounted on a wheel which is likely to reduce speed and increase energy (e.g., fuel) consumption.

Therefore, what is desirable is a tube-type tire that can be used by high performance (e.g., racing) vehicles but has the characteristics of a tubeless tire so as to avoid the shortcomings that have heretofor been associated with conventional tube-type tires.

SUMMARY OF THE INVENTION

In general terms, a pneumatic sealing ring is disclosed for use with a tube-type tire and rim so that the tube-type tire will operate without a conventional inner tube and as if it were tubeless. The pneumatic sealing ring is adapted to create an efficient seal within a main tire section of the tire. In this regard, the rim includes a generally flat shelf which lies between an upwardly turned vertical lip and a downwardly turned arcuate beadwell. The main tire section has a relatively large volume air chamber at the interior thereof. The pneumatic sealing ring includes a thin inner tube having a relatively small volume air chamber, whereby the inner tube is incapable of providing run flat support. The air chamber of the inner tube of the sealing ring is inflated to a pressure that is at least twice the pressure to which the air chamber of the main tire section is inflated to ensure a proper sealing effect of the pneumatic sealing ring against the inside of the main tire section.

The main tire section is seated upon the shelf of the rim, and the inner tube of the pneumatic sealing ring is seated upon the beadwell of the rim such that the air chamber of the main tire section is isolated from the rim. The sealing ring also includes an outer liner that is disposed in surrounding engagement over the inner tube. The liner is manufactured from a resilient material that is adapted to expand in response to the air chamber of the inner tube being inflated. Flexible casing cords run around the liner to provide structural reinforcement when the liner is expanded. The outer liner of the pneumatic sealing ring is moved into sealing engagement with the main tire section of the tire as the air chamber of the inner tube is inflated. To this end, one or more sealing rings project outwardly from the side walls of the outer liner to form an efficient seal with the main tire section and force the main tire section against the vertical lip of the rim. A centering lip projects downwardly from each side wall to be seated against the beadwell of the rim and thereby enable the liner to be self-centering over and around the inner tube.

The liner of the pneumatic sealing ring is covered by an optional rigid (e.g., plastic) shield. The shield provides a protective wall that safeguards the inner tube of the sealing ring lying below the liner from sharp objects within the air chamber of the main tire section. A series of deflectors project upwardly from the shield and into the air chamber of the main tire section. The deflectors are shaped to deflect thorns, and the like, that might cause damage to the inner tube.

In accordance with an alternate embodiment of the pneumatic sealing ring, a hollow threaded rim lock bolt extends through the tire rim, past the inner tube, and through the expandable outer liner to communicate with the air chamber of the main tire section so as to establish a passage through which the air chamber is inflated. The rim lock bolt runs through a deflector that is preferably manufactured from rubber. The deflector is located between the outer liner of the sealing ring and the rim to compress a section of the inner tube and thereby permit the rim lock bolt to pass outside the inner tube and unobstructed through the sealing ring to the air chamber of the main tire section. A rim lock nut is coupled to one end of the rim lock bolt outside the rim. A rim lock plate is coupled to the opposite end of the rim lock bolt within the air chamber of the main tire section. As the rim lock nut is tightened down against the rim, the rim lock plate is correspondingly pulled into sealing engagement against the main tire section to prevent the main tire section from spinning on the rim in response to the torque that is developed by the motor of a motorcycle.

In a modification to the pneumatic sealing ring, a valve stem extends through the rim. An air port extends through the expandable outer liner to communicate with the air chamber of the main tire section. An air bypass hose is connected between the valve stem and the air port to establish a passage through which the air chamber of the main tire section is inflated. The air bypass hose runs around one side of the sealing ring so as to lie between the inner tube and the expandable liner thereof.

BRIEF DESCRIPTION OF THE DRAWINGS

FIG. 1 shows a tube-type tire including the pneumatic sealing ring of this invention mounted on the rim of a spoke-type wheel of the kind commonly used by bicycles and motorcycles;

FIG. 2 is a cross-section taken along lines 2-2 of FIG. 1 showing the pneumatic sealing ring isolating the air chamber of a main tire section of the tire from the rim on which the sealing ring is seated;

FIG. 3 is a cross-section showing the pneumatic sealing ring of FIG. 2 with a modification including a deflector by which to enable a hollow rim lock bolt to be connected to a rim lock plate to prevent the main tire section of the tire from spinning on the rim;

FIG. 4 is a top view of the deflector and the rim lock bolt connected to the rim lock plate taken in the direction of reference arrow 4 of FIG. 3.

DESCRIPTION OF THE PREFERRED EMBODIMENT

Figure 5:
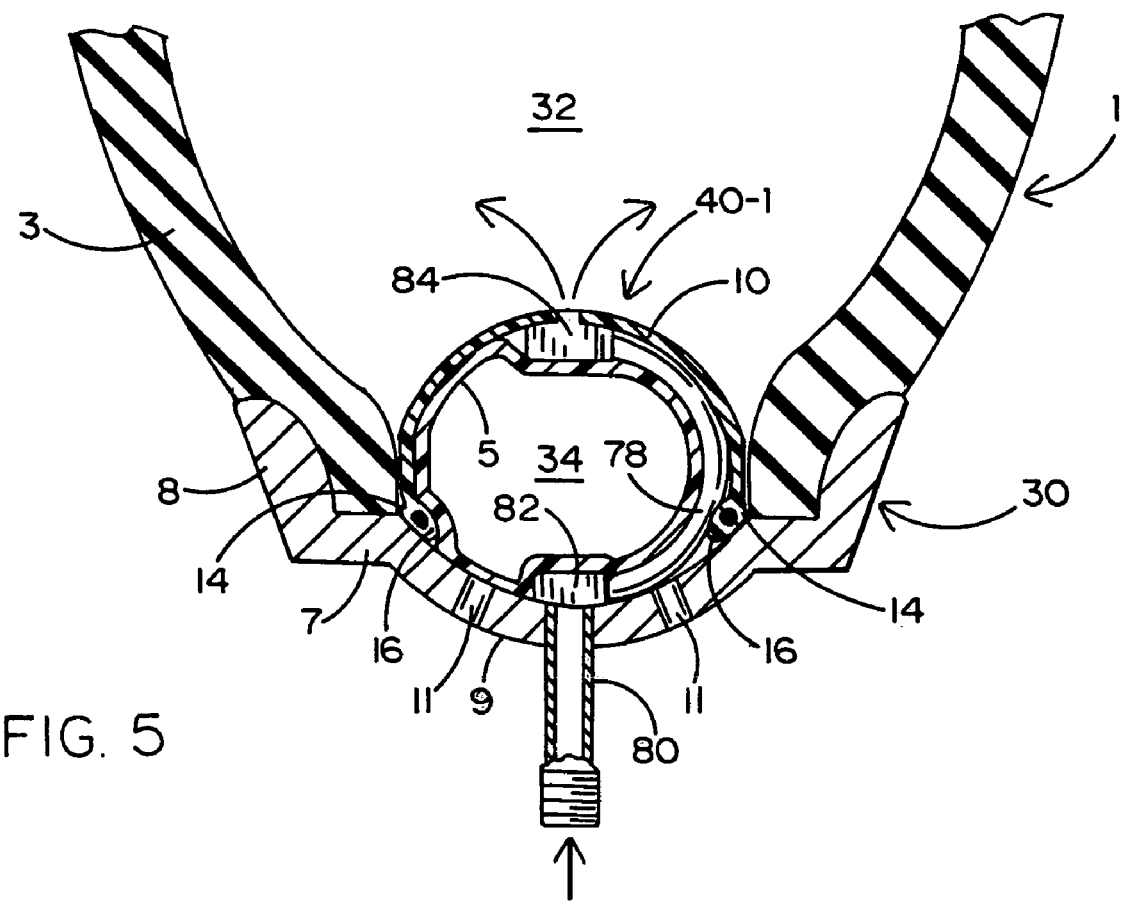
FIG. 5 shows an additional modification to the pneumatic sealing ring of FIG. 2.

A first preferred embodiment for a pneumatic sealing ring 40 which forms the present invention for use with a tube-type tire 1 and a suitable rim 30 is described while referring to FIGS. 1 and 2 of the drawings. The tube-type tire 1 includes an outer inflatable main tire section 3. The pneumatic sealing ring 40 includes an inflatable inner tube 5 which extends circumferentially around the rim 30 inside the main tire section 3. The main tire section 3 is typically manufactured from thick rubber. The inner tube 5 of sealing ring 40 is preferably manufactured from a relatively thin (e.g., butyl) rubber material or a similar membrane. The tire 1 to which the sealing ring 40 will be mated is ideally mounted on a metal rim 30 having a generally flat shelf 7 located between an upturned vertical lip 8 and a downturned arcuate beadwell 9.

The main tire section 3 of the tube-type tire 1 is seated on the shelf 7 of the rim 30 so as to press against the vertical lip 8 thereof. The inner tube 5 of pneumatic sealing ring 40 is seated on the beadwell 9 of the rim 7. The tire 1 and its rim 30 as herein described are particularly suitable for a spoke-type wheel (best shown in FIG. 1) such as that usually required by a bicycle or a motorcycle. Accordingly, a set of spoke holes 11 are formed through the rim 30 at the beadwell 9 to receive respective spokes (designated 33 in FIG. 1). However, it is to be understood that the tire 1 can be employed on the wheel of any vehicle where a tube-type tire is desirable.

The main tire section 3 has a relatively large volume air chamber 32 at the interior thereof that is inflated with air. The inner tube 5 of pneumatic sealing ring 40 has a smaller volume air chamber 34 that is also inflated with air. As an important feature of the sealing ring 40, the inner tube 5 thereof is seated upon the rim 30 so as to isolate the air chamber 32 of main tire section 3 from the rim 30.

The pneumatic sealing ring 40 includes an outer liner 10 to lay over and around the inner tube 5 and thereby separate the inner tube 5 from the main tire section 3 and its air chamber 32. The air chamber 34 of the inner tube 5 is ideally inflated to a pressure of approximately 100 psi by way of an integral valve stem 36. The main tire section 3 includes a valve stem (not shown) through which the air chamber 32 thereof is ideally inflated with air to a lower pressure of approximately 15-20 psi. While the precise pressures to which the air chambers 32 and 34 of the main tire section 3 and the inner tube 5 of the tube-type tire 1 are inflated may vary with application, the pressure to which the inner tube 5 is inflated must be at least twice the pressure to which the main tire section 3 is inflated to enable the pneumatic sealing ring 40 to generate a sufficiently strong sealing force against tire section 3 for a purpose that will soon be described.

The outer liner 10 of sealing ring 40 is preferably manufactured from a resilient (e.g., rubber) material that is adapted to expand when the air chamber 34 of the inner tube 5 is inflated. Casing cords 12 that are manufactured from an (e.g., aramid) fiber material run continuously around the liner 10 between opposing beads 18 to provide structural reinforcement and limit the expansion of the liner 10 in response to the inflation of the air chamber 34 of inner tube 5. To this end, one or more sealing O-rings 14 are molded into each of the sidewalls of the liner 10. The O-rings 14 extend outwardly from the liner 10 to be sealed against the inside of main tire section 3 when the air chamber 34 of inner tube 5 is inflated. A centering lip 16 projects downwardly from each of the opposite sidewalls of the liner 10 below the bead 18 thereof. The centering lips 16 are seated upon the beadwell 9 of rim 30 and enable the outer liner 10 to be self-centering in surrounding engagement around the inner tube 5 in order to provide a uniform sealing force against the main tire section 3.

The pneumatic sealing ring 40 also includes an optional protective shield 20 that lies overtop the outer liner 10. The shield 20 is ideally manufactured from a rigid material (e.g., plastic) and is intended to safeguard the liner 10 and the inner tube 5 lying thereunder from puncture wounds and similar damage. A series of deflectors 22 (only one of which being shown) project upwardly from the shield 20 for receipt within the air chamber 32 of the main tire section 3. The deflectors 22 are (e.g., nipple) shaped so as to be able to deflect thorns and similar sharp objects away from the inner tube 5. The deflectors 22 are ideally manufactured from rubber.

With the added benefit of the pneumatic sealing ring 40 herein disclosed, the tube-type tire 1 having a standard rim 30 will be able to operate without a conventional inner tube and as if it were a tubeless tire. That is to say, the inner tube 5 of sealing ring 40 having a small volume air chamber 34 is separated from the relatively large volume air chamber 32 of the main tire section 3 by means of the outer expandable liner 10. Therefore, the main tire section 3 and the inner tube 5 enclose separate and distinct air chambers 32 and 34 within the tire 1 so as to form a dual air chamber tire. The inner tube 5 seats against the beadwell 9 of the rim 30 and extends circumferentially around the rim 30 so as to advantageously seal off (i.e., isolate) the air chamber 32 of main tire section 3 from the rim 30 and thereby eliminate the need for a conventional inner tube on a tube-type rim.

In this regard, because the air chamber 34 of the inner tube 5 of pneumatic sealing ring 5 is inflated to a much greater pressure than the air chamber 32 of the main tire section 3 of tire 1, the inner tube will be capable of exerting a pushing or sealing force against the resilient liner 10. By virtue of its sealing O-ring 14 and centering lips 16, the outer expandable liner 10 of pneumatic sealing ring 40 will be automatically and evenly aligned between the main tire section 3 and the inner tube 5 to create an efficient seal against the inside of the main tire section 3 and thereby force the outside of the main tire section 3 against the vertical tip 8 of the rim 30 in response to an inflation of inner tube 5.

It may also be appreciated that the inner tube 5 is considerably thinner, smaller in size and lighter in weight than the thicker main tire section 3 of the tube-type tire 1. Hence, and unlike conventional tube-type tire and rim assemblies, the inner tube 5 of the pneumatic sealing ring 40 of this invention is substantially confined to the beadwell 9 of rim 30. Because of its correspondingly small size relative to commercially available pneumatic inner liners, inserts, and the like, of the kind shown, for example, in U.S. Pat. Nos. 5,246,050 or 6,688,359, the resilient liner 10 herein disclosed will offer no run flat support in the event that the main tire section 3 should suffer a blowout. Moreover, because of the small size of my inner tube 5 within the outer liner 10, such inner tube will not be susceptible to pinching and will require less frequent repair and replacement than that experienced by inner tubes in conventional tube-type tires.

It is contemplated that the pneumatic sealing ring 40 including the inner tube 5, outer liner 10 and optional shield 20 will be sold as a unit (e.g., in kit form) to enable a retrofit of the main tire section 3 in the shop to produce a tire 1 having the benefits of this invention. In the alternative, the tire 1 can be sold as a finished assembly including the main tire section 3 and the sealing ring 40 mounted on the rim 30 as described above.

FIGS. 3 and 4 of the drawings show a pneumatic sealing ring 50 including a modification to the sealing ring 40 described above. The tube-type tire 1 and the rim 30 to which the sealing ring 50 is mated may be identical to those shown in FIGS. 1 and 2 and, therefore, identical reference numerals will be used to identify identical components. Similar to sealing ring 40, the pneumatic sealing ring 50 of FIGS. 3 and 4 includes an inflatable inner tube 52 which extends circumferentially around the beadwell 9 of rim 30 inside the main tire section 3. Like that described above, the sealing ring 50 has a relatively small volume air chamber 54 that is inflated to a relatively high pressure with respect to the relatively large volume air chamber 32 of the main tire section 3.

Also like that described above, the pneumatic sealing ring 50 includes an expandable outer liner 56 lying over and around the inner tube 52 so as to separate the inner tube 52 from the air chamber 32 of main tire section 3. As with the flexible liner 10 of the sealing ring 40 of FIG. 2, the flexible liner 56 of pneumatic sealing ring 50 includes one or more sealing O-rings 58 that are molded into the sidewalls thereof and extend outwardly therefrom. Accordingly, the O-rings 58 will be sealed against the inside of the main tire section 3 when the air chamber 54 of inner tube 52 is inflated and the outer liner 56 is correspondingly expanded so that the air chamber 32 of main tire section 3 is isolated from the rim 30. A centering lip 60, which projects downwardly from each of the opposite sidewalls of the liner 56 below the beads 62 is seated upon the beadwell 9 of rim 30 to enable the liner 56 to be self-centering in surrounding engagement with the inner tube 52.

In the embodiment of FIGS. 3 and 4, a stem (similar to that designated 36 in FIG. 2) extends through the rim 30 and the inner tube 52 to enable the air chamber 54 to be inflated. A threaded hollow rim lock bolt 64 extends through the rim 30, past the inner tube 52, and into the main tire section 3 so as to communicate with the air chamber 32 thereof and provide a passage through which air chamber 32 can be inflated. A threaded rim lock nut 66 (of FIG. 3) is rotated around one end of the threaded bolt 64 at a location outside the beadwell 9 of rim 30. A rigid (e.g., metal) rim lock plate 68 having a threaded hole through the center thereof is rotated around the opposite end of the threaded bolt 64 within the air chamber 32 of main tire section 3. Alternatively, the rim lock plate 68 can be welded around the bolt 64.

As the rim lock nut 66 is rotated around the rim lock bolt 64 and tightened down against the beadwell 9 of rim 30, the rim lock plate 68 is correspondingly pulled towards the outer liner 56 and tightened down against the main tire section 3. By virtue of the foregoing, the rim lock plate 68 is forced into locking engagement against the inside of the main tire section 3. The locking pressure of the rim lock plate 68 against the main tire section 3 advantageously prevents tire section 3 from spinning on the rim 30 as the tire 1 rides along a roadway. That is to say, it is known for the main tire section 3 to be subjected to a spinning force in response to the usual torque that is generated by the motor of a motorcycle or similar motorized vehicle on which the tire 1 has been mounted.

To enable the hollow rim lock bolt 64 to move unobstructed through the sealing ring 50 and past the inner tube 52 thereof so as to communicate with the air chamber 32 of the main tire section 3, the bolt 64 is inserted through a deflector 74. More particularly, the deflector 74 is preferably a block of rubber, or the like, that is located at one side of the inner tube 52 between the outer expandable liner 56 of sealing ring 50 and the beadwell 9 of rim 30. The deflector 74 functions to apply a pushing force against the inner tube 52 so as to compress a section 52-1 (of FIG. 4) thereof against the main tire section 3 so that the inner tube 52 will wrap around the deflector 74 so as not to interfere with the rim lock bolt 64 depending downwardly from the rim lock plate 68 and running through the sealing ring 50 at one side of the inner tube 52.

FIG. 5 of the drawings shows the tube-type tire 1 including the main tire section 3 seated on the rim 30 in the manner of FIG. 2. By way of an additional modification to the sealing ring 40, the pneumatic sealing ring 40-1 of FIG. 5 includes an air bypass hose 78. The air bypass hose 78 extends between a threaded valve stem 80 and the air chamber 32 of the main tire section 3. The air bypass hose 78 bypasses air chamber 34 and enables the air chamber 32 to be inflated. In this case, another valve stem (such as that designated 36 in FIG. 2) extends through the rim 30 to permit the air chamber 34 of inner tube 5 to be inflated.

One end of the air bypass hose 78 is connected to a valve 82 of the valve stem 80 outside inner tube 5. The opposite end of the bypass hose 78 is connected to an air port 84 that is also located outside inner tube 5 and communicates with the air chamber 32 of main tire section 3 through the expandable outer liner 10 of the sealing ring 40-1. The air port 84 is preferably bonded (e.g., vulcanized) to liner 78 to avoid a detachment. Accordingly, an air flow passage is established from the valve 82 of valve stem 80, through the air bypass hose 78, to air chamber 32 via air port 84.

The air bypass hose 78 is disposed between the inner tube 5 and the outer liner 10 of pneumatic sealing ring 40-1 so as to travel outside the inner tube 5 and around one side of the sealing ring 40-1. That is, the inner tube 5 and the outer flexible liner 10 located thereover are separated from one another by the run of the bypass hose 78 between the valve 82 of valve stem 80 and the air port 84 which communicates with air chamber 32.

The invention claimed is:

1. A combination comprising:
a tube-type tire to be mounted on a rim of a wheel, said tire including a main tire section that is adapted to extend circumferentially around the rim of the wheel and having an air chamber that is inflated with air to a first pressure,
an inner tube that is adapted to extend circumferentially around the rim of the wheel and having an air chamber that is inflated with air to a second pressure, the second pressure to which the air chamber of said inner tube is inflated being greater than the first pressure to which the air chamber of said main tire section is inflated and wherein the volume and the size of the air chamber of said inner tube is smaller than the volume and the size of the air chamber of said main tire section such that said inner tube is incapable of providing run flat support should the tire experience a flat in response to a deflation of the air chamber of said main tire section, the air chamber of said main tire section being sealed from the air chamber of said inner tube to prevent the respective first and second pressures thereof from reaching equilibrium, and
a liner laying on said inner tube so as to separate said inner tube from the air chamber of said main tire section, said liner including a sealing surface that creates an air tight seal between the inside of said main tire section and the rim of the wheel in order to isolate the air chamber of the main tire section from the rim when said liner is forced against the inside of said main tire section in response to the air chamber of said inner tube being inflated with air to the second pressure,
said liner having continuous reinforcing cords running therethrough and connected to beads located at opposite sides of said liner, said liner also having a space extending between said beads at the opposite sides of said liner such that said liner extends only partially around said inner tube, said inner tube being spaced from said main tire section so that said main tire section cannot collapse against either one of said inner tube or said liner and the tire cannot ride on either one of said inner tube or said liner thereover should the air chamber of said main tire section be deflated.

2. The combination recited in claim 1, wherein the second pressure to which the air chamber of said inner tube is inflated is at least twice the first air pressure to which the air chamber of said main tire section is inflated.

3. The combination recited in claim 1, further comprising a valve stem extending through the rim to the air chamber of said inner tube by which air is supplied to said air chamber to inflate said inner tube.

4. The combination recited in claim 1, wherein said liner is manufactured from a resilient material so as to be capable of expanding in response to the air chamber of said inner tube being inflated with air.

5. The combination recited in claim 1, wherein the sealing surface of said liner includes at least one sealing ring extending outwardly therefrom and moving into sealing engagement with said main tire section when said liner is forced against said main tire section in response to the air chamber of said inner tube being inflated with air to the second pressure.

6. The combination recited in claim 1, wherein said liner includes a centering lip projecting from each side thereof to be seated against the rim, whereby said liner is centered over said inner tube in surrounding engagement therewith such that the sealing surface of said liner is forced against the interface of said main tire section with the rim of the wheel to prevent the air with which the air chamber of said main tire section is inflated from leaking past said interface.

7. The combination recited in claim 1, further comprising a shield located inside the air chamber of said main tire section and lying against said liner so as to establish a protective wall over said inner tube, whereby to prevent sharp objects within the air chamber of said main tire section from penetrating said liner and said inner tube.

8. The combination recited in claim 7, further comprising a deflector projecting from said shield and into the air chamber of said main tire section whereby to deflect sharp objects within said air chamber away from said inner tube.

9. A combination comprising:

a wheel having a rim including a generally flat shelf lying between a lip projecting upwardly from said shelf and a beadwell projecting downwardly from said shelf;

a tube-type tire to be mounted on the rim of said wheel, said tire comprising a main tire section seated upon the shelf of said rim and having an air chamber to be inflated with air to a first pressure, and an inner tube seated upon the beadwell of said rim and having an air chamber to be inflated with air to a second pressure, said inner tube seated upon said rim so as to isolate the air chamber of said main tire section from said rim;

the second pressure to which the air chamber of said inner tube is inflated being greater than the first pressure to which the air chamber of said main tire section is inflated to force said main tire section against the upwardly projecting lip of said rim;

an air passage extending through the rim, outside the inner tube, and into the air chamber of the main tire section, whereby to enable said air chamber to be inflated with air; and a deflector seated upon the rim alongside a portion of said inner tube, said air passage extending through said deflector so as to lie outside said inner tube.

10. The combination recited in claim 9, wherein said air passage has a threaded first end and an opposite end, said combination further comprising a threaded fastener surrounding the threaded first end of said air passage outside the rim and a locking plate attached to the opposite end of said air passage within the air chamber of the main tire section, said fastener being rotated around said threaded first end and tightened down against said rim to cause said locking plate to be correspondingly pulled towards said inner tube to be locked against the main tire section to prevent said main tire section from spinning around said rim.

11. The combination recited in claim 9, wherein the volume of the air chamber of said inner tube is smaller than the volume of the air chamber of said main tire section such that said inner tube is incapable of providing run flat support should said tire experience a flat in response to a deflation of the air chamber of said main tire section.

12. The combination recited in claim 9, further comprising an expandable liner seated upon said rim and extending in surrounding engagement over said inner tube, whereby to separate said inner tube from the air chamber of the main tire section, said liner expanding and being forced into sealing engagement against said main tire section when the air chamber of said inner tube is inflated with air to the second pressure.

13. The combination recited in claim 12, wherein said expandable liner is manufactured from a resilient material so as to be capable of expanding in response to the air chamber of said inner tube being inflated with air, said expandable liner having continuous flexible cords running therearound to provide structural reinforcement to said liner as said liner expands in response to the air chamber of said inner tube being inflated with air.

14. The combination recited in claim 12, wherein said expandable liner includes at least one sealing ring extending outwardly therefrom and moving into sealing engagement with said main tire section when said liner is forced against said main tire section in response to the air chamber of said inner tube being inflated with air to the second pressure.

15. The combination recited in claim 12, wherein said expandable liner includes a centering lip projecting from each side thereof to be seated against the beadwell of said rim, whereby said liner is centered over said inner tube in surrounding engagement therewith.

16. The combination recited in claim 12, further comprising an air hose lying between said inner tube and said expandable liner thereover, said air hose communicating with the air chamber of the main tire section, whereby to enable said air chamber to be inflated with air.

17. The combination recited in claim 16, further comprising a valve stem extending through the rim and coupled to one end of said air hose and an air port coupled to the opposite end of said air hose and extending through said expandable liner so as to be communicate with the air chamber of the main tire section, said air chamber being inflated with air by way of an air passage including said valve stem, said air hose, and said air port.

18. A combination comprising:

a pneumatic sealing ring to be mounted on the rim of a wheel with an outer tire section, wherein the rim includes a generally flat shelf lying between a lip extending upwardly from the shelf and a beadwell extending downwardly from the shelf and the outer tire section is seated on the shelf of the rim and having an air chamber to be inflated with air to a first pressure, said pneumatic sealing ring including an inner tube to be seated upon the beadwell of said rim within the outer tire section so as to isolate the air chamber of the outer tire section from the rim, said inner tube having an air chamber to be inflated with air to a second pressure which is greater than the first pressure to which the air chamber of the outer tire section is inflated, said pneumatic sealing ring also including an expandable liner seated upon the rim and extending in surrounding engagement over said inner tube, said liner being expanded and forced into sealing engagement against the outer tire section when the air chamber of said inner tube is inflated with air to the second pressure;

an air passage extending through the rim, outside said inner tube, and into the air chamber of the main tire section, whereby to enable said air chamber to be inflated with air, said air passage having a threaded first end and an opposite end;

a threaded fastener surrounding the threaded first end outside the rim; and a locking plate attached to the opposite end of said air passage within the air chamber of the main tire section, said fastener being rotated around said threaded first end and tightened down against said rim to cause said locking plate to be correspondingly pulled towards said inner tube to be locked against the main tire section to prevent said main tire section from spinning around said rim.

\* \* \* \* \*